United States Patent
Zhang et al.

(10) Patent No.: US 12,470,262 B2
(45) Date of Patent: Nov. 11, 2025

(54) METHOD AND APPARATUS FOR CALIBRATION IN DISTRIBUTED MIMO NETWORKS

(71) Applicant: Samsung Electronics Co., Ltd., Suwon-si (KR)

(72) Inventors: Jianzhong Zhang, Dallas, TX (US); Yang Li, Plano, TX (US); Gilwon Lee, Dallas, TX (US); Yeqing Hu, Allen, TX (US); Shadi Abu-Surra, Plano, TX (US); Md. Saifur Rahman, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 343 days.

(21) Appl. No.: 18/330,316

(22) Filed: Jun. 6, 2023

(65) Prior Publication Data

US 2024/0048191 A1 Feb. 8, 2024

Related U.S. Application Data

(60) Provisional application No. 63/395,637, filed on Aug. 5, 2022, provisional application No. 63/394,898, filed on Aug. 3, 2022.

(51) Int. Cl.
| | |
|---|---|
| *H04B 7/0417* | (2017.01) |
| *H04B 7/0452* | (2017.01) |
| *H04L 5/00* | (2006.01) |

(52) U.S. Cl.
CPC ........ *H04B 7/0417* (2013.01); *H04B 7/0452* (2013.01); *H04L 5/0053* (2013.01)

(58) Field of Classification Search
CPC ... H04B 7/0417; H04B 7/0452; H04L 5/0053; H04L 5/0048
See application file for complete search history.

(56) References Cited

U.S. PATENT DOCUMENTS

| | | |
|---|---|---|
| 9,565,646 B1 | 2/2017 | Pearson et al. |
| 10,644,812 B2 | 5/2020 | Yoo et al. |
| 11,133,875 B2 | 9/2021 | Wang et al. |

(Continued)

OTHER PUBLICATIONS

International Search Report and Written Opinion issued Sep. 19, 2023 regarding International Application No. PCT/KR2023/008648, 10 pages.

(Continued)

*Primary Examiner* — Harry H Kim

(57) ABSTRACT

Calibration in distributed multiple input multiple output (MIMO) networks. A method performed by a first base station (BS) includes receiving a first uplink (UL) reference signal (RS) and determining, based on the first UL RS and a second UL RS, a first phase offset for transmission of a first downlink (DL) RS to a user equipment (UE). The second UL RS is associated with a second BS. The first phase offset of the first DL RS is relative to a second DL RS associated with the second BS. The method further includes transmitting the first DL RS with the first phase offset; receiving UE feedback associated with the first DL RS and the second DL RS; and determining, based on the first phase offset and the received feedback, for a DL data transmission to the UE, a second phase offset between transmissions of the first BS and the second BS.

20 Claims, 11 Drawing Sheets

(56) References Cited

U.S. PATENT DOCUMENTS

| | | | |
|---|---|---|---|
| 11,411,778 | B2 | 8/2022 | Chen et al. |
| 11,879,988 | B2* | 1/2024 | Kumar ............... H04W 64/00 |
| 2004/0130485 | A1* | 7/2004 | Rapoport ............ G01C 15/00 |
| | | | 342/357.27 |
| 2015/0207597 | A1 | 7/2015 | Zhao et al. |
| 2017/0339658 | A1 | 11/2017 | Wang et al. |
| 2018/0167903 | A1 | 6/2018 | Fan et al. |
| 2018/0302866 | A1 | 10/2018 | Zhang et al. |
| 2018/0317186 | A1 | 11/2018 | Fan et al. |
| 2019/0141649 | A1 | 5/2019 | Hu et al. |
| 2019/0349033 | A1 | 11/2019 | Fakoorian et al. |
| 2020/0076483 | A1 | 3/2020 | Zhang et al. |
| 2020/0177331 | A1 | 6/2020 | Fehrenbach et al. |
| 2021/0289383 | A1 | 9/2021 | Marinier et al. |
| 2022/0014956 | A1 | 1/2022 | Rahman et al. |
| 2022/0123977 | A1* | 4/2022 | Jiang ................... H04B 7/0626 |
| 2023/0421426 | A1* | 12/2023 | Schidl .................... H03D 1/24 |

OTHER PUBLICATIONS

Nokia et al., "CSI enhancement for high/medium UE velocities and CJT", 3GPP TSG RAN WG1 Meeting #109-e, R1-2204540, May 2022, 30 pages.

InterDigital, Inc., "Enhanced SRS Operation", 3GPP TSG RAN WG1 #109-e, R1-2203382, May 2022, 5 pages.

"3rd Generation Partnership Project; Technical Specification Group Radio Access Network; Evolved Universal Terrestrial Radio Access (E-UTRA); Physical channels and modulation (Release 16)", 3GPP TS 36.211 V16.4.0, Dec. 2020, 249 pages.

"3rd Generation Partnership Project; Technical Specification Group Radio Access Network; Evolved Universal Terrestrial Radio Access (E-UTRA); Multiplexing and channel coding (Release 16)", 3GPP TS 36.212 V16.4.0, Dec. 2020, 254 pages.

"LTE; Evolved Universal Terrestrial Radio Access (E-UTRA) Physical layer procedures (3GPP TS 36.213 version 16.4.0 Release 16)", ETSI TS 136 213 V16.4.0, Feb. 2021, 577 pages.

"3rd Generation Partnership Project; Technical Specification Group Radio Access Network; Evolved Universal Terrestrial Radio Access (E-UTRA); Medium Access Control (MAC) protocol specification (Release 16)", 3GPP TS 36.321 V16.3.0, Dec. 2020, 142 pages.

"LTE; Evolved Universal Terrestrial Radio Access (E-UTRA); Radio Resource Control (RRC); Protocol specification (3GPP TS 36.331 version 16.3.0 Release 16)", ETSI TS 136 331 V16.3.0, Jan. 2021, 1089 pages.

"5G; NR; Physical channels and modulation (3GPP TS 38.211 version 16.4.0 Release 16)", ETSI TS 138 211 V16.4.0, Jan. 2021, 137 pages.

"5G; NR; Multiplexing and channel coding (3GPP TS 38.212 version 16.4.0 Release 16)", ETSI TS 138 212 V16.4.0, Jan. 2021, 155 pages.

"5G; NR; Physical layer procedures for control (3GPP TS 38.213 version 16.4.0 Release 16)", ETSI TS 138 213 V16.4.0, Jan. 2021, 185 pages.

"5G; NR; Physical layer procedures for data (3GPP TS 38.214 version 16.4.0 Release 16)", ETSI TS 138 214 V16.4.0, Jan. 2021, 173 pages.

"5G; NR; Physical layer measurements (3GPP TS 38.215 version 16.4.0 Release 16)", ETSI TS 138 215 V16.4.0, Jan. 2021, 31 pages.

"5G; NR; Medium Access Control (MAC) protocol specification (3GPP TS 38.321 version 16.3.0 Release 16)", ETSI TS 138 321 V16.3.0, Jan. 2021, 158 pages.

"5G; NR; Radio Resource Control (RRC); Protocol specification (3GPP TS 38.331 version 16.3.1 Release 16)", ETSI TS 138 331 V16.3.1, Jan. 2021, 916 pages.

Extended European Search Report issued May 13, 2025 regarding Application No. 23850252.0, 11 pages.

Qualcomm Incorporated, "OTA calibration for multi-TRP transmission", 3GPP TSG RAN WG1 RAN1 #89, R1-1708585, May 2017, 6 pages.

* cited by examiner

METHOD AND APPARATUS FOR CALIBRATION IN DISTRIBUTED MIMO NETWORKS

CROSS-REFERENCE TO RELATED AND CLAIM OF PRIORITY

The present application claims priority under 35 U.S.C. § 119(e) to U.S. Provisional Patent Application No. 63/394,898 filed on Aug. 3, 2022 and U.S. Provisional Patent Application No. 63/395,637 filed on Aug. 5, 2022, which are hereby incorporated by reference in their entirety.

TECHNICAL FIELD

The present disclosure relates generally to electronic devices and methods on calibration mechanisms for distributed multiple input multiple output (MIMO) operations, and more specifically, the present disclosure related to apparatuses and methods on calibration mechanism in distributed MIMO networks.

BACKGROUND

As wireless communication has grown and the number of subscribers to wireless communication services continues to grow quickly, the demand for wireless data traffic is rapidly increasing due to the growing popularity among consumers and businesses. For a cellular system operating in low carrier frequency in a sub-1 GHz frequency range, e.g., less than 1 GHz, supporting a large number of channel state information (CSI)-reference signal (RS) antenna ports, e.g., 32, or many antenna elements at a single location or remote radio head (RRH) is challenging. The challenge is due to a larger antenna form factor size needed when considering carrier frequency wavelength. This is not a challenge for a system operating at a higher frequency, such as 2 GHz or 4 GHz. At such low frequencies, the maximum number of CSI-RS antenna ports that can be co-located at a site or RRH can be limited to, for example, 8. The maximum number of CSI-RS antenna ports that can be co-located limits the spectral efficiency of such systems. In particular, the multi-user (MU)-MIMO spatial multiplexing gains that are due to the large number of CSI-RS antenna ports, such as 32, cannot be achieved due to the antenna form factor limitation.

SUMMARY

The present disclosure relates to calibration in distributed MIMO networks.

In one embodiment, a first base station (BS) is provided. The first BS includes a transceiver configured to receive a first uplink (UL) reference signal (RS) and a processor operably coupled to the transceiver. The processor is configured to determine, based on the first UL RS and a second UL RS, a first phase offset for transmission of a first downlink (DL) RS to a user equipment (UE). The second UL RS is associated with a second BS. The first phase offset of the first DL RS is relative to a second DL RS associated with the second BS. The transceiver is further configured to transmit the first DL RS with the first phase offset and receive, from the UE, feedback associated with the first DL RS and the second DL RS. The processor is further configured to determine, based on the first phase offset and the received feedback, for a DL data transmission to the UE, a second phase offset between transmissions of the first BS and the second BS.

In another embodiment, a user equipment (UE) is provided. The UE includes a transceiver configured to transmit an UL RS, receive a first DL RS from a first BS, and receive a second DL RS from a second BS, wherein the DL RS has a first phase offset relative to the second DL RS and wherein the first phase offset is associated with the UL RS. The UE further includes a processor operably coupled to the transceiver. The processor is configured to determine, based on the first DL RS and a second DL RS, feedback associated with the first DL RS and the second DL RS. The transceiver is further configured to transmit the feedback, and receive a DL data transmission based on signals from the first BS and the second BS, respectively. The signal from the first BS has a second phase offset relative to the signal from the second BS. The second phase offset is associated with the feedback.

In yet another embodiment, a method performed by a first BS is provided. The method includes receiving a first UL RS and determining, based on the first UL RS and a second UL RS, a first phase offset for transmission of a first DL RS to a UE. The second UL RS is associated with a second BS. The first phase offset of the first DL RS is relative to a second DL RS associated with the second BS. The method further includes transmitting the first DL RS with the first phase offset; receiving, from the UE, feedback associated with the first DL RS and the second DL RS; and determining, based on the first phase offset and the received feedback, for a DL data transmission to the UE, a second phase offset between transmissions of the first BS and the second BS.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The terms "TRP", "gNB" and "BS" are used interchangeably. The terms "CSI-RS port" and "antenna port" are used interchangeably. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Definitions for other certain words and phrases are provided throughout this patent document. Those of ordinary skill in the art should understand that in many, if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1-11, discussed below, and the various, non-limiting embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since the deployment of 4G communication systems, efforts have been made to develop an improved 5G or pre-5G communication system. Therefore, the 5G or pre-5G communication system is also called a "beyond 4G network" or a "post LTE system."

The 5G communication system is implemented in higher frequency (mmWave) bands, e.g., 60 GHz bands, to accomplish higher data rates. To decrease propagation loss of the radio waves and increase the transmission coverage, beamforming, massive multiple-input multiple-output (MIMO), full dimensional MIMO (FD-MIMO), array antenna, an analog beam forming, large-scale antenna techniques and the like are discussed in 5G communication systems.

In addition, in 5G communication systems, development for system network improvement is underway based on advanced small cells, cloud radio access networks (RANs), ultra-dense networks, device-to-device (D2D) communication, wireless backhaul communication, moving network, cooperative communication, coordinated multi-point (CoMP) transmission and reception, interference mitigation and cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and non-limiting embodiments of the present disclosure may be utilized in connection with any frequency band. For example, aspects of the present disclosure may also be applied to user equipments (UEs) operating with other radio access technologies (RATs) or standards. For example, different releases/generations of 3GPP standards, such as 5G and 6G, and IEEE standards, such as 802.16 WiMAX and 802.11 Wi-Fi, and so on.

Figure 1:
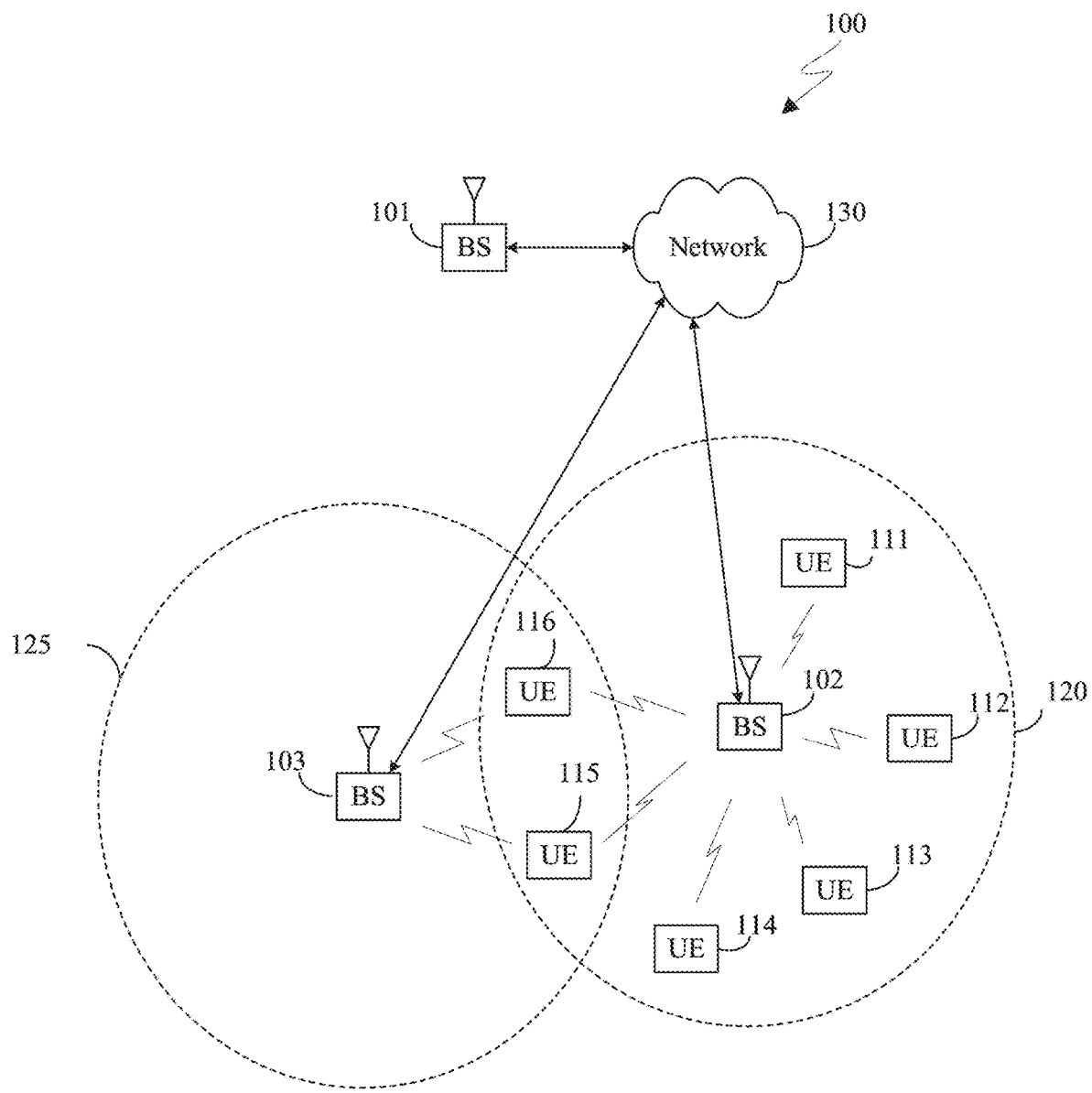
FIG. 1 illustrates an example wireless network according to various embodiments of the present disclosure.
Figure 2:
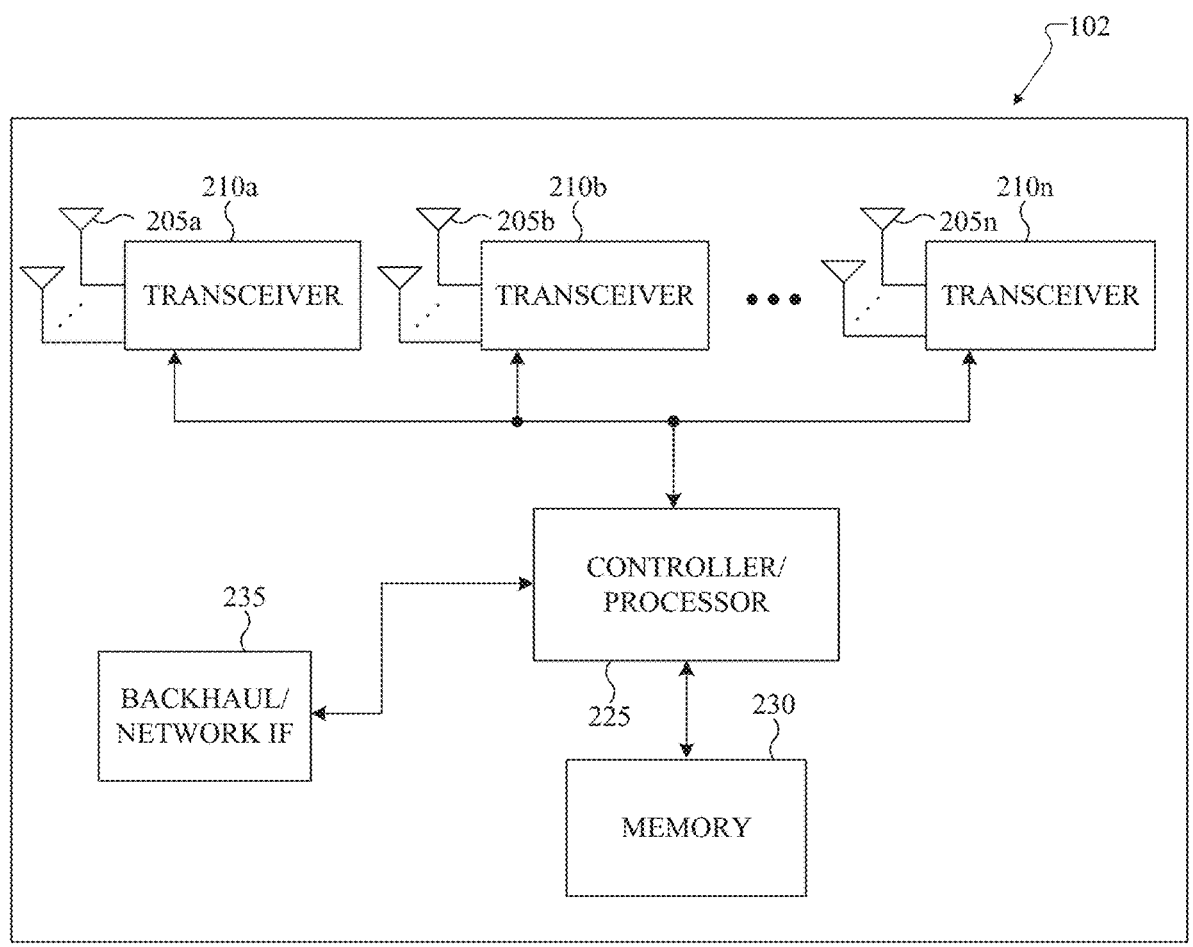
FIG. 2 illustrates an example BS according to embodiments of the present disclosure.
Figure 3:
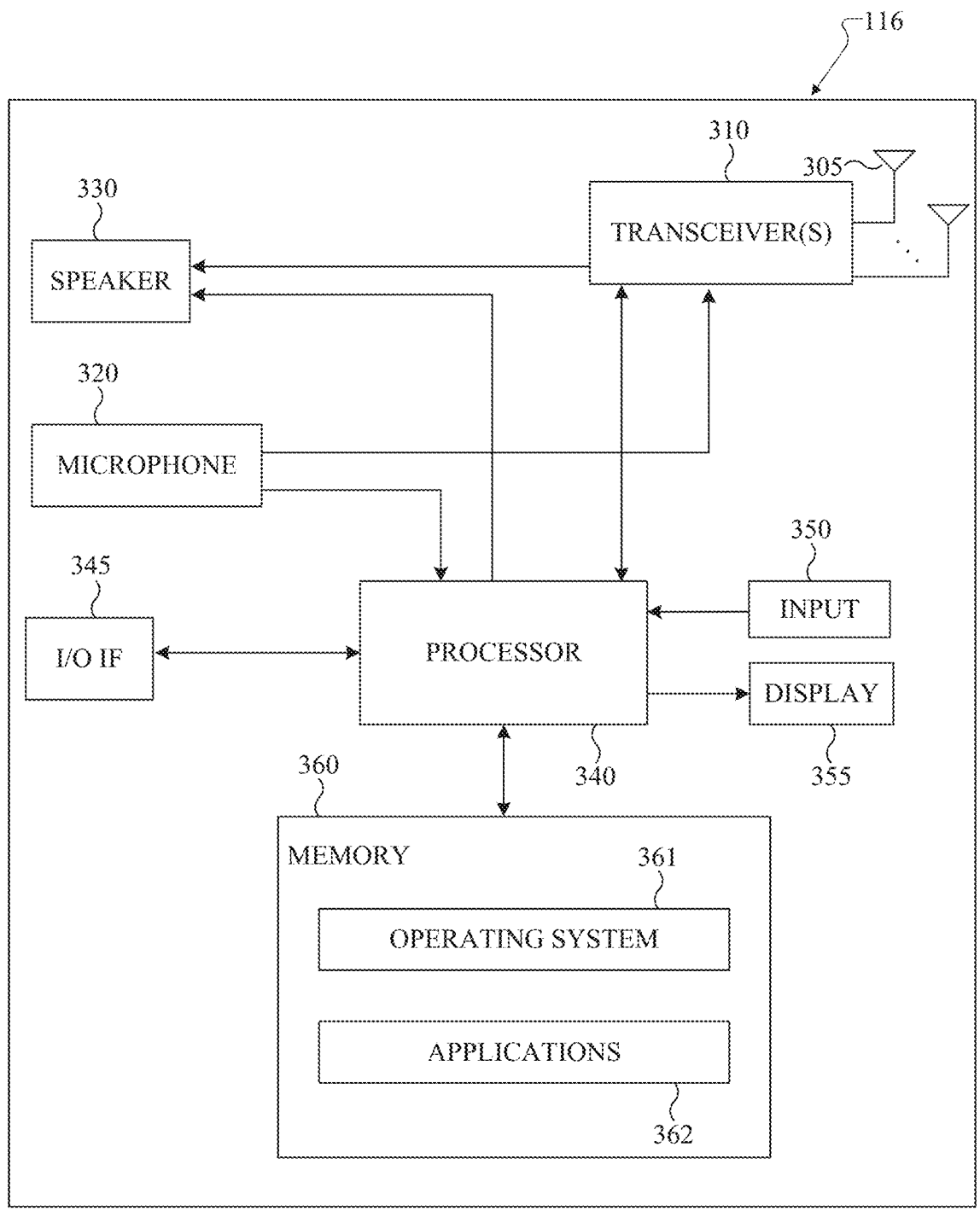
FIG. 3 illustrates an example of a UE according to embodiments of the present disclosure.

FIGS. 1-3 below describe various embodiments implemented in wireless communications systems with the use of orthogonal frequency division multiplexing (OFDM) or orthogonal frequency division multiple access (OFDMA) communication techniques. The descriptions of FIGS. 1-3 are not meant to imply physical or architectural limitations to how different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or another data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3$^{rd}$ generation partnership project (3GPP) NR, long term evolution (LTE), LTE advanced (LTE-A), high speed packet access (HSPA), Wi-Fi 802.11a/b/g/n/ac, etc. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

The dotted lines show the approximate extents of the coverage areas 120 and 125, which are shown as approximately circular for illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, the UE 116 includes circuitry, programming, or a combination thereof for assisting calibration enhancements in a distributed MIMO. In certain embodiments, one or more of the gNBs 101-103 include circuitry, programming, or a combination thereof for supporting calibration enhancements in a distributed MIMO. For example, one or more of the gNBs 101-103 may be located in the same cell and operate as distributed TRPs in the cell to provide service to the UE 116 and, in various embodiments, the gNBs 101-103 may perform calibration among each other, which in at least some embodiments is assisted by the UE 116.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example of gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming radio frequency (RF) signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as processes for calibration enhancements in a distributed MIMO as described in greater detail below. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example of UE 116 according to embodiments of the present disclosure. The embodiment of the UE 116 is illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna(s) 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. For example, in various embodiments, the UE 116 uses beamforming for DL receptions from the eNB 102 and/or 103 for calibration of distributed MIMO.

In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350 and the display 355. The operator of the UE 116 can use the input 350 to enter data into the UE 116. The display 355 may be a liquid crystal display, light emitting diode display, or other display capable of rendering text and/or at least limited graphics, such as from websites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Embodiments of the present disclosure recognize that one way to operate a system with a large number of CSI-RS antenna ports at low carrier frequencies is to distribute the physical antenna ports to different panels/RRHs, which can be possibly non-collocated. The multiple sites or panels/RRHs can still be connected to a single common base unit forming a single antenna system; hence, the signal transmitted/received via multiple distributed RRHs can still be processed at a centralized location.

Various embodiments of the present disclosure provide methods to perform calibration for the radio frequency (RF) receive/transmit antenna network of multiple RRHs/panels in the system to utilize downlink (DL)/uplink (UL) channel reciprocity, which can be realized based on single panel codebook and feedback design.

Figure 4:
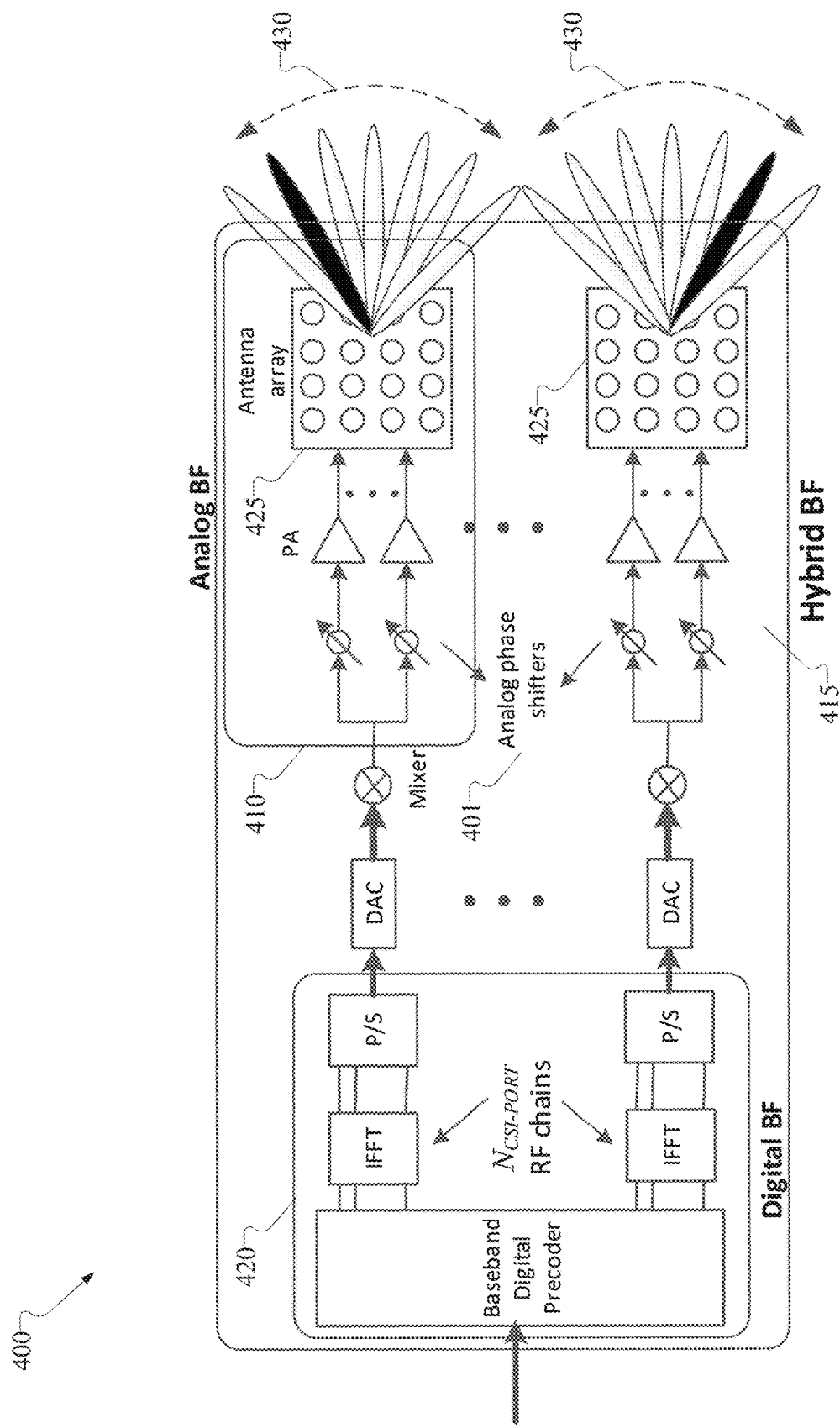
FIG. 4 illustrates an example of a transmitter structure for beamforming according to embodiments of the present disclosure.

FIG. 4 illustrates an example of a transmitter structure 400 for beamforming according to various embodiments of the present disclosure. The non-limiting embodiment of the transmitter structure 400 illustrated in FIG. 4 is for illustration only. FIG. 4 does not limit the scope of this disclosure to any particular implementation of the transmitter structure 400. In certain embodiments, one or more of gNB 102 or UE 116 includes the transmitter structure 400. For example, one or more of antenna 205 and its associated systems or antenna 305 and its associated systems can be included in transmitter structure 400.

In the example shown in FIG. 4, the transmitter structure 400 includes an analog phase shifter 401, an analog beamformer (BF) 410, a hybrid BF 415, a digital BF 420, and one or more antenna arrays 425, which can be controlled by the bank of analog phase shifters 401. One antenna port can then correspond to one sub-array which produces a narrow analog beam through analog beamforming by analog BF 410. The analog beam can be configured to sweep 430 across a wider range of angles by varying the phase shifter bank 401 across symbols or subframes.

Release 14 LTE and Release 15 NR support up to 32 Channel State Information Reference Signal (CSI-RS) antenna ports, enabling an eNB to be equipped with a large number of antenna elements. For example, 64 or 128 antenna elements equipped to eNB 102. A plurality of antenna elements are mapped onto one CSI-RS port. For mmWave bands, the number of antenna elements can be larger for a given form factor; however, the number of CSI-RS ports tends to be limited due to hardware constraints as illustrated in FIG. 4. For example, the feasibility to install a large number of ADCs/DACs at mmWave frequencies tend to be limited.

In this case, one CSI-RS port is mapped onto a large number of antenna elements which can be controlled by a bank of analog phase shifters 401. One CSI-RS port can then correspond to one sub-array which produces a narrow analog beam through analog beamforming 405. This analog beam can be configured to sweep 430 across a wider range of angles by varying the phase shifter bank across symbols or subframes. The number of sub-arrays is equal to the number of RF chains and is the same as the number of CSI-RS ports NCSI-PORT. A digital beamforming unit 420 performs a linear combination across NCSI-PORT analog beams to further increase precoding gain. Digital precoding can be varied across frequency sub-bands or resource blocks because analog beams are wideband and not frequency selective. Receiver operation can be conceived analogously.

The transmitter structure 400 utilizes multiple analog beams for transmission and reception. For example, after a training duration, one or a small number of analog beams are selected out of a large number to be performed over time.

This includes, for example, indicating the assigned DL or UL transmit (TX) beam, measuring at least one reference signal (RS) for calculating, and performing beam reporting and receiving a DL or UL transmission via a selection of a corresponding receive (RX) beam.

Transmitter structure 400 is also applicable to higher frequency bands. For example, frequency bands greater than 52.6 GHz. In this case, the system can employ only analog beams. Due to the O2 absorption loss around 60 GHz frequency, which is around 10 dB additional loss at a distance of 100 meters, a larger number of analog beams and sharper analog beams will be needed to compensate for the additional path loss. For this reason, there is a larger number of radiators in the array.

At lower frequency bands, such as frequency range 1 (FR1) or particularly sub-1 GHz band, the number of antenna elements cannot be increased in a given form factor due to large wavelength if a critical distance greater than or equal to $\lambda/2$ between two adjacent antenna elements is maintained in deployment scenarios. For example, for the case of the wavelength size of the center frequency 600 MHz, which is 50 cm, it requires 4 m for a uniform-linear-array (ULA) antenna panel of 16 antenna elements with a half-wavelength distance between two adjacent antenna elements. Considering a plurality of antenna elements is mapped to one digital port in practical cases, the required size for antenna panels at gNB to support a large number of antenna ports, e.g., 32 CSI-RS ports, becomes very large in such low frequency bands, and it leads to the difficulty of deploying 2-D antenna arrays within the size of a conventional form factor. This can result in a limited number of physical antenna elements and, subsequently CSI-RS ports, that can be supported at a single site and limit the spectral efficiency of such systems.

Embodiments of the present disclosure also recognize that calibration is an important issue for distributed MIMO. To maintain the reciprocity between DL and UL channels in the TDD system, large MIMO base stations use an on-board coupling network and calibration circuits to measure the gain and phase differences among transceivers in the same radio frequency (RF) unit. For the on-board calibration, one RF chain corresponding to one antenna port serves as a reference to other RF chains for other antenna ports. In the case of the distributed MIMO, such reference transceiver's signal needs to be shared between distributed RRHs/panels/modules, which are physically far apart. Using RF cables to distribute the reference is not preferable as it limits the deployment scenarios. In the distributed MIMO, the use of different local oscillators (LOs) between distributed antenna modules imposes even more challenges in achieving calibration as the phase of LOs could drift. Periodic calibration is needed to compensate for the phase drift as well.

Accordingly, various embodiments of the present disclosure provide over-the-air (OTA) signaling mechanisms and calculation algorithms for calibration among the RRHs/panels of distributed MIMO networks. For example, various embodiments provide for UL RS transmission and UL channel estimation, (beamformed DL RS transmission/reception based on UL channel estimation and calibration coefficient estimation, multiple CSI (e.g., RI/PMI/CQI) reporting, and gNB calculation based on reported CSI. In other examples, various embodiments provide for user selection algorithms to perform such UL and DL signaling to assisted calibration.

Figure 5:
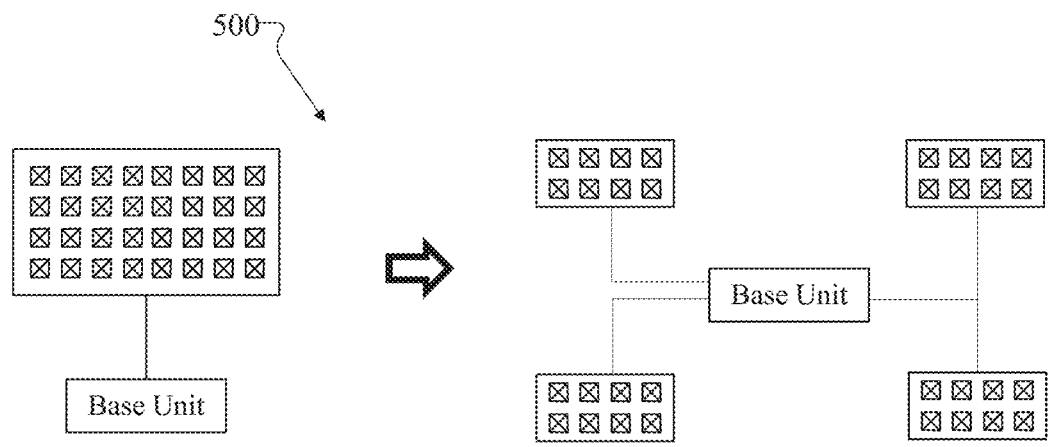
FIG. 5 illustrates an example of distributed MIMO according to embodiments of the present disclosure.

FIG. 5 illustrates an example of a distributed MIMO 500 according to various embodiments of the present disclosure. For example, the distributed MIMO 500 forms multiple antenna panels, such as antenna modules or RRHs, with a small number of antenna ports instead of integrating all the antenna ports in a single panel or at a single site and distributing the multiple panels in multiple locations/sites or RRHs. For example, the a distributed MIMO 500 may be implemented by one or more BSs such as BS 102. The MIMO 500 is for illustration only and other embodiments can be used without departing from the scope of the present disclosure.

Figure 6:
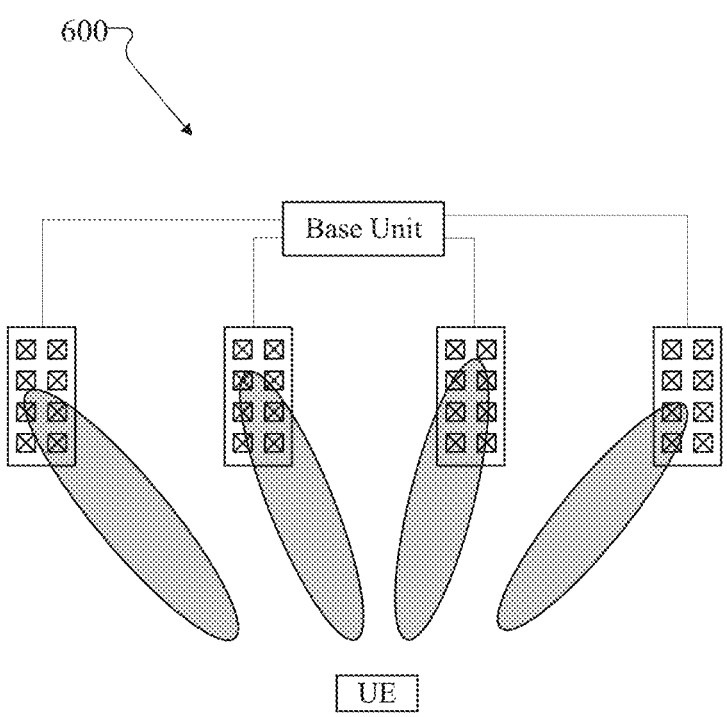
FIG. 6 illustrates an example of a distributed MIMO according to embodiments of the present disclosure.

FIG. 6 illustrates another example of a distributed MIMO 600 according to various embodiments of the present disclosure. For example, the a distributed MIMO 500 may be implemented by one or more BSs such as BS 102. The MIMO 500 is for illustration only and other embodiments can be used without departing from the scope of the present disclosure.

As illustrated, multiple antenna panels at multiple locations can still be connected to a single base unit (e.g., in one of BSs 101-103). Thus, the signal transmitted/received via multiple distributed panels can be processed in a centralized manner through the single base unit. In another embodiment, multiple distributed antenna panels are connected to more than one base unit, which communicates with each other while jointly supporting the single antenna system.

Embodiments of the present disclosure recognize and take into consideration that time division duplexing (TDD), an approach to acquire DL channel state information is to exploit UL channel estimation through receiving UL RS s, for example, a sounding reference signal (SRS), sent from the UE 116. By using channel reciprocity in TDD systems, the UL channel estimation itself can be used to infer DL channels. This feature enables the network (NW) to reduce the training overhead significantly; however, due to the RF impairment at the transmitter and receiver, directly using the UL channels for DL channels is not accurate and requires a periodic calibration process among receive and transmit antenna ports of the RF network at the NW. In general, the NW has an on-board calibration mechanism in its own RF network to calibrate its antenna panels having a plurality of receiver/transmitter antenna ports, to enable DL/UL channel reciprocity in channel acquisition. The on-board calibration mechanism can be performed via small-power RS transmission and reception from/to the RF antenna network of NW and thus it can be done by NW's implementation in a confined manner, i.e., that does not interfere with other entities. Embodiments of the present disclosure recognize that, despite this, it becomes difficult to perform the on-board calibration in distributed MIMO systems due to the distribution of the panels/RRHs over a wide region. Thus, OTA signaling mechanisms are provided to calibrate receive/transmit antenna ports among multiple RRHs/panels far away in a distributed MIMO.

Embodiments of the present disclosure provide UE-assisted calibration mechanisms for distributed MIMO systems. A high-level description of multiple CSI reporting is provided in U.S. application Ser. No. 17/673,641 filed on Feb. 16, 2022, which is incorporated by reference in its entirety. Although low-band TDD systems are exemplified, the present disclosure can be applied to any frequency band in FR1, i.e., low frequency bands, and/or FDD systems without departing from the scope of the present disclosure.

All the following components and embodiments are applicable, for example, to UL transmission with cyclic prefix (CP)-orthogonal frequency division multiplexing (OFDM) waveform as well as discrete fourier transform (DFT)-spread OFDM and single-carrier frequency division multiple access (SC-FDMA) waveforms according to various embodiments of the present disclosure. Furthermore, all the following components and embodiments are applicable for UL transmission when the scheduling unit in time is either one subframe, which can consist of one or multiple slots.

Figure 7A:
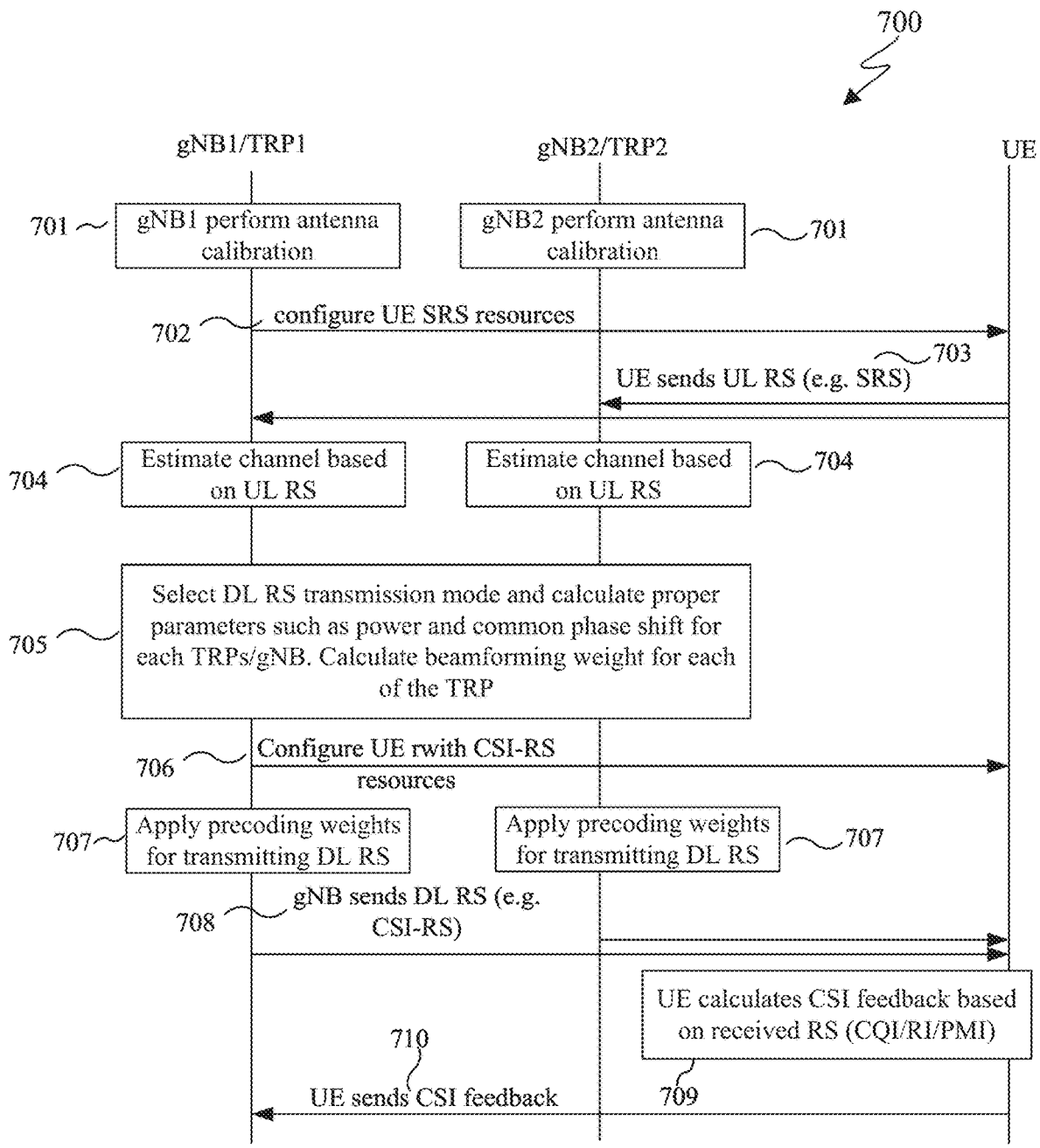
FIGS. 7A and 7B illustrate a flowchart of an example of signal flow for the calibration method via feedback of precoding matrix indicator (PMI) constellation point according to embodiments of the present disclosure.
Figure 7B:
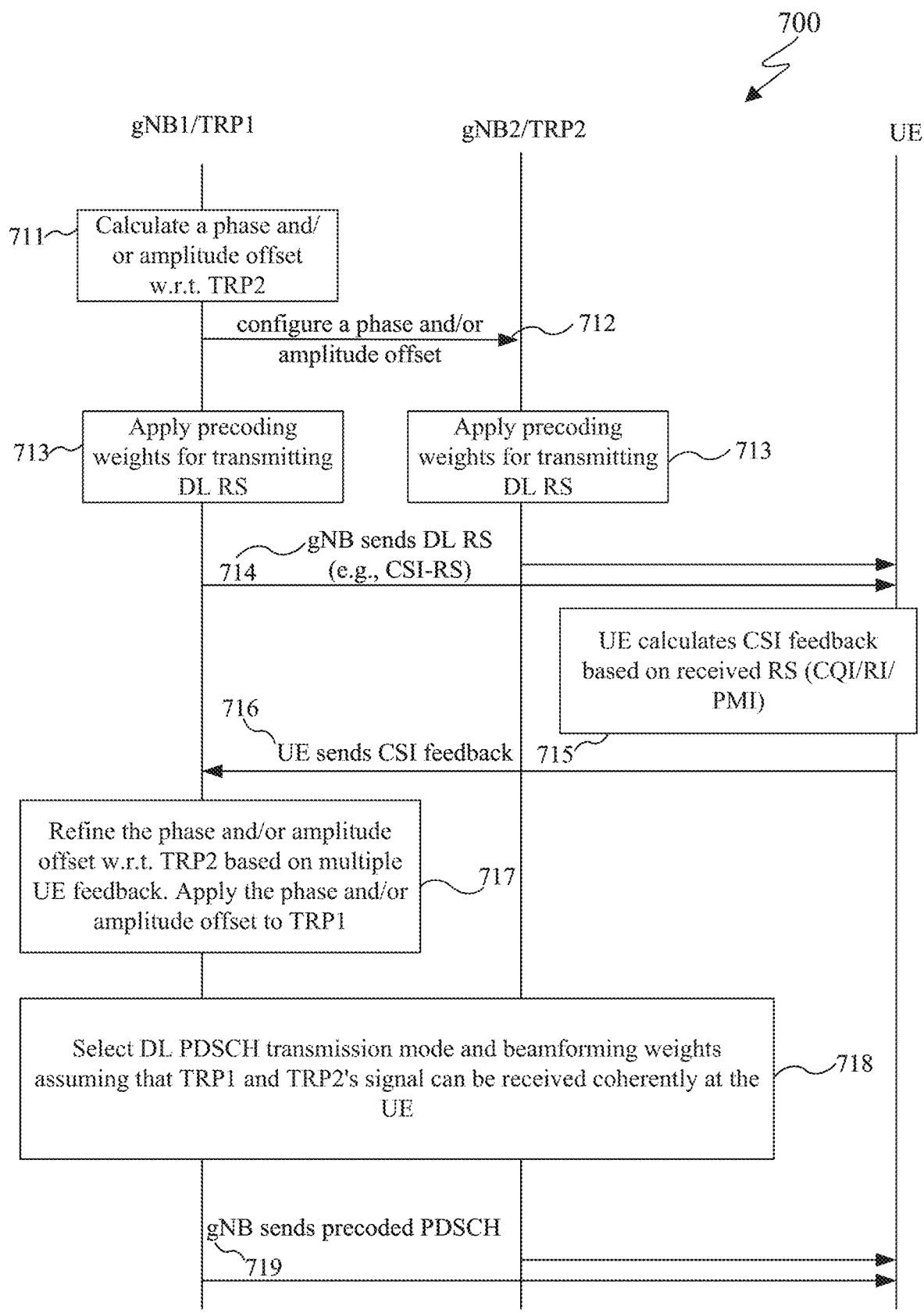

FIGS. 7A and 7B illustrate a flowchart of an example process 700 for signal flow for the proposed calibration mechanism that aims to enable phase or amplitude alignment among two or more gNBs according to various embodiments of the present disclosure. For example, the process 700 may be implemented by UE 116 and gNBs 102 and 103. The process 700 is for illustration only and other embodiments can be used without departing from the scope of the present disclosure.

FIGS. 7A and 7B illustrate an example of signal flow for the calibration mechanisms of the present disclosure that enable phase and/or amplitude alignment among two or more gNBs or TRPs. Also, note that the steps specified below may have the order swapped and/or skipped. Without loss of generosity, FIGS. 7A and 7B discuss two TRP cases, yet the method described here can be generated for more than two TRPs. Note that in the present disclosure, the case of an antenna port of the UE 116 is discussed and it can be extended to the case of multiple antenna ports of the UE 116 by introducing another dimension. It is sufficient to discuss a single antenna port at UE 116 side because embodiments of the present disclosure provide methods for calibrating distributed antenna panels at the NW side.

The case of an antenna port of the UE 116 is provided and it can be extended to the case of multiple antenna ports of the UE 116 by introducing another dimension. Embodiments describing a single antenna port at UE 116 side are discussed since various embodiments provide methods for distributing antenna panels at the NW side.

The process begins in step 701, the two TRPs 102 and 103 that participate in this across TRP calibration perform antenna calibration within the TRPs, respectively. After the antenna calibration process for the two TRPs, in step 702, gNB 102 will configure SRS resources for the UE 116. In one embodiment, one of the gNB (e.g., serving gNB) configures SRS resources to the UE 116. In another embodiment, the multiple TRPs 102 and 103 configure SRSs respectively to the UE 116.

In an additional embodiment, the UE 116 is configured/triggered with L UL RSs or UL RS resource sets, e.g., SRS resource or resource sets. In one example, an RRH can be associated with a collection of SRS ports and associated with one SRS resource. In another example, a TRP 102 can be associated with a collection of SRS resources and can be associated with an SRS resource set. In yet another embodiment, the UE 116 is configured/triggered with L UL RSs or UL RS resource sets, e.g., SRS resource or resource sets. In one example, L=1. In another example, L=N$_{TRP}$, where N$_{TRP}$ is the number of TRPs that NW may want to calibrate. In one example, M=1. In another example, M=L. In another example, M≥L. In another example, M≤L. In another example, M=N$_{TRP}$. Here, the linkage information between UL RS resources/resource sets and DL RS resources/resource sets is incorporated into the UL RS triggering/configuring request, and thus the UE 116 can expect to receive DL RS s/resource sets under the linkage.

In another variation, the UE 116 is configured/triggered with L UL RS resource sets, e.g., SRS resource or resource sets. Each DL RS resource set could be associated with a different RRH. Here, the linkage information between UL RS resources/resource sets and DL RS resources/resource sets is incorporated into the UL RS triggering/configuring request, and thus the UE 116 can expect to receive DL RS s/resource sets under the linkage.

In yet another variation, the UE 116 is configured/triggered with L UL RS resource sets, e.g., SRS resource or resource sets. In one example, L=1, and each DL RS resource set could be associated with a different RRH. Here, the linkage information between UL RS resources/resource sets and DL RS resources/resource sets is incorporated into the UL RS triggering/configuring request, and thus the UE 116 can expect to receive DL RS s/resource sets under the linkage.

Moving forward, in step 703, the UE 116 then sends the UL RS, e.g., SRS, to gNB1 and gNB2. In one embodiment, the UE 116 sends a SRS that can be received at both TRP 102 and 103. In another embodiment, the UE 116 sends multiple SRS which can be received by the multiple TRPs, respectively. In yet embodiment, the UE is configured to transmit one or multiple UL RSs, e.g., SRS, for NW to estimate UL channels.

The following, in step 704, involves gNB 102 and gNB 103 estimating the UL channel based on the UE 116's UL RS from step 703. In one embodiment, multiple TRPs on the NW can estimate UL channels via the UL RS reception. For example, the UL channels for a given resource, RE/RB/RBG or any other given resource unit, that are estimated at each RRH/panel i can be expressed as $h_i^{UL}=R_i g_i t^m$, where $R_i$ is an $N_i \times N_i$ diagonal matrix with complex diagonal elements $r_1, \ldots, r_{N_i}$ and indicates the RF impairment at the receiver antenna ports of TRP i, and $g_i$ is an $N_i \times 1$ channel vector for the UL physical propagation channels between UE 116 and RRH/panel i and $t^m$ is a complex scalar value that corresponds to the RF impairment at a transmitter antenna port m of the UE 116.

Note that the UL channel $h_i^{UL}$ is not the same as the actual UL propagation channels due to the RF impairment of the receiver and transmitter. The corresponding DL channels can be expressed as $(h_i^{DL})^H = r^m g_i^H T_i$, where $T_i$ is an $N_i \times N_i$ diagonal matrix with complex diagonal elements $t_1, \ldots, t_{N_i}$ and indicates the RF impairment at the transmitter antenna ports of TRP i, and $g_i^H$ is an $1 \times N_i$ channel vector for the DL physical propagation channels between UE 116 and TRP i, and $r^m$ is a complex scalar value that corresponds to the RF impairment at the receiver antenna port of the UE 116. The DL physical propagation channels are, or can be regarded to be, the same as the UL physical propagation channels within the coherence time in TDD systems.

Note that in step 701, the NW can compute calibration coefficients $$C_i = \frac{1}{\gamma_i} T_i^{-1} R_i$$

for the antenna ports within the TRP i, whereof $\gamma_i \neq 0$ is an arbitrary complex reference value for TRP i, and apply the calibration coefficient matrix in the RF network of TRP i to get a scaled version of the DL channel from the UL channel, i.e., $$(h_i^{UL})^H C_i^{-1} = \gamma_i t^m g_i^H T_i. \tag{1}$$

Note that the calibration coefficients $C_i$ can be computed via on-board calibration per TRP, and $\gamma_i$ is not known to the NW.

Progressing through example process 700, in step 705, where gNB 102 and gNB 103 select the DL RS transmission mode based on UL channel estimation. In one embodiment, based on the UL channel estimation, the NW applies beamforming or precoding for DL RS transmissions from multiple TRPs and transmits DL RSs using the beamforming. The example process 700 proceeds in step 706, gNB 102 and gNB 103 configure the UE 116 with CSI-RS resources.

Having completed the previous step, in step 707, gNB 102 and gNB 103 apply precoding weights for transmitting DL RS to UE 116. In one embodiment, based on the UL channel estimation, the NW applies beamforming or precoding for DL RS transmissions from multiple TRP. In another embodiment, the UE 116 is configured/triggered with L UL RS resource sets, e.g., SRS resource or resource sets, each of which is linked with, or associated with, a DL RS resource set, e.g., a CSI-RS resource set. Each DL RS resource set could be associated with a different RRH. Here, the linkage information between UL RS resources/resource sets and DL RS resources/resource sets is incorporated into the UL RS triggering/configuring request, and thus the UE 116 can expect to receive DL RS s/resource sets under the linkage.

At this point, in step 708, gNB1 and gNB2 sends DL RS, e.g., CSI-RS, to the UE 116. In one embodiment, the multiple TRPs transmit DL RS using beamforming, and the UE 116 is configured/triggered to receive the DL RS. In one example, the DL RS transmissions are performed within the coherence time of the UL RS transmission beforehand.

In another embodiment, the NW performs DL RS transmissions from multiple TRPs each with matched-filter (MF) beamforming or conjugate beamforming, i.e., $w_i = \alpha_i (\gamma_i t_i^m)^* T_i^H g_i$, based on the UL channel estimation applied with calibration coefficient matrix as shown in equation (1), where $\alpha_i > 0$ is a designed/calculated phase and/or amplitude offset and $(A)^*$ is conjugate of A. The MF beamforming can enable UE 116 to estimate the resultant signal value:

$$(h_i^{DL})^H w_i = r^m g_i^H T_i \alpha_i (\gamma_i t_i^m)^* T_i^H g_i = \alpha_i \gamma_i^* (t^m)^* r^m \|T_i^H g_i\|^2 \quad (2)$$

for DS RS transmission from TRP i. Note that the UE 116 now receives an equivalent channel for RS s sent from all TRPs $$[\alpha_1 \gamma_1^* (t^m)^* r^m \|T_1^H g_1\|^2, \ldots, \alpha_K \gamma_K^* (t^m)^* r^m \|T_K^H g_K\|^2]$$

Normalized by the phase and amplitude of the first TRP:

$$h_{eff} = \left[1, \frac{\alpha_2 \gamma_2^* \|T_2^H g_2\|^2}{\alpha_1 \gamma_1^* \|T_1^H g_1\|^2}, \ldots, \frac{\alpha_K \gamma_K^* \|T_K^H g_K\|^2}{\alpha_1 \gamma_1^* \|T_1^H g_1\|^2}\right] \quad (3)$$

Note that the above derivation is based on a single frequency point for simplicity, but the general principle can also be applied to a multi-carrier system.

To continue with the process 700, in step 709, the UE 116 calculates the CSI feedback based on received RS, e.g., channel quality indicator (CQI)/rank indicator (RI)/PMI. In one embodiment.

$$A_i = \frac{\alpha_i \gamma_i^*}{\alpha_1 \gamma_1^*} \text{ and } B_i = \frac{\|T_i^H g_2\|^2}{\|T_1^H g_1\|^2}.$$

The objective of cross-TRP calibration is to estimate $A_i$, especially the phase.

$$h_{eff} = \left[1, \frac{\alpha_2 \gamma_2^* \|T_2^H g_2\|^2}{\alpha_1 \gamma_1^* \|T_1^H g_1\|^2}, \ldots, \frac{\alpha_K \gamma_K^* \|T_K^H g_K\|^2}{\alpha_1 \gamma_1^* \|T_1^H g_1\|^2}\right]$$

$$h_{eff} = [1, A_2 B_2, \ldots, A_K B_K]$$

The UE 116 will perform PMI selection that can match the direction of the effective channel well. Denote the $\ell$ th PMI vector as $$P_\ell = [1, e^{\theta_{\ell,2}}, \ldots, e^{\theta_{\ell,K}}]^T$$

Then, the selected PMI shall match $h_{eff}$ well, i.e., the inner product is maximized:

$$\ell_{sel} = \arg\max |h_{eff}^H P_\ell|^2$$

As a result, one may expect that $\angle A_i \approx e^{\theta_{\ell,i}}$. Note that in a multicarrier system, denote $h_{eff,q}$ is denoted as the effective channel at subcarrier or RB q, where q=1, ..., Q. And the procedure for the UE 116 to select PMI may be in principle written as $$\ell_{sel} = \arg\max \sum_{q=1}^{Q} |h_{eff,q}^H P_\ell|^2$$

In an embodiment where two TRPs are utilized, a two TX codebook or two port codebook is configured. In another embodiment, $\alpha_1 = \alpha_2 = 1$, i.e., no pre-distortion of the common phase and amplitude.

$$h_{eff} = [1, A_2 B_2]$$

$$P_\ell = [1, e^{\theta_{\ell,2}}]^T$$

Note that $B_2$ is a positive real number. The selected PMI shall maximize $|h_{eff}^H P_\ell|$ or the phase $\theta_{\ell,2}$ shall be closest to $\angle A_2$. Note that in the 2Tx code book, $\theta_{\ell,2} = \{0, 90, 180, 270\}$ degree.

In yet another embodiment, $\alpha_1 = 1$, $\alpha_2 \neq 1$, $$h_{eff} = [1, \alpha_2 A_2 B_2]$$

The benefit of having $\alpha_2 \neq 1$ is that it can compensate the power difference of the received power from different TRPs, for example $|\alpha_2 A_2 B_2| \approx 1$, so that the selection of PMI is more robust to noise. Having completed the previous step, in step 710, the UE 116 sends the CSI feedback to gNB 102.

For example, in step 711, the gNB 102 calculates a phase and/or amplitude offset with respect to gNB 103. In one embodiment, only the phase $\angle A_i$ is estimated. In the case of two TRPs and two TX ports, the estimated $\angle A_i \approx \theta_{\ell_{sel},2}$.

In another embodiment, the phase $\angle A_i$ is estimated via multiple reports from the UE 116 where each CSI report is obtained by precoding or virtualizing CSI-RS differently, i.e., applying different $\alpha_1$, $\alpha_2$. In one example, $\alpha_1 = 1$, $\alpha_2 = e^{\theta_n}$, where $\theta_n$ is the phase offset at the second TRP at the nth feedback report. For the nth report:

$$\angle A_i + \theta_n = \theta_{\ell_{sel},2,n} + \Delta \theta_n$$

where $\Delta \theta_n$ is the unknown quantization error due to limited PMI phase constellation. Then, gNB 103 may combine the total of N reported values to refine the measurement. In one example, $$\angle A_i = \frac{1}{N} \sum_{n=1}^{N} (\theta_{\ell_{sel},2,n} - \theta_n)$$

In one embodiment, $\{\theta_n\}$ is in an uniform manner, $\theta_n=n\cdot\Delta$, where $\Delta$ is a constant degree, e.g., 10-degree. In another embodiment, $\{\theta_n\}$ can be designed in a way that depends on the previous feedback PMI so that the number of iterations can be reduced to attain the desired accuracy. For example, in the 2Tx code book, $\theta_{\ell,2}=\{0, 90, 180, 270\}$ degree. If the $\angle A_i$ based on the first report is $\angle A_{i,1}=0$, one may set $\theta_2=45$ degree; if $\angle A_{i,2}=90$, it implies the true $\angle A_i$ is between (0, 45) degrees; otherwise if $\angle A_{i,2}=0$, then it implies that the true $\angle A_i$ is between (−45, 0) degree. Now depending on the second report result, for example, $\angle A_{i,2}=90$, $\theta_3=22.5$ degrees is configured. If $\angle A_{i,3}=90$, it implies the true $\angle A_i$ is between (22.5, 45) degrees; otherwise, if $\angle A_{i,3}=0$, then it implies that the true $\angle A_i$ is between (0, 22.5) degree. And so on, various embodiments may further refine the phase accuracy. With that stage complete, in step 712, the gNB 102 configures a phase and/or amplitude offset for the UE 116.

Next, in step 713, the gNB 102 and gNB 103 apply precoding weights for transmitting DL RS. In one embodiment, the gNB 102 configures a Type-II CSI codebook to the UE 116. In one embodiment, for obtaining calibration coefficients across TRP, the gNB 102 configures the UE 116 with higher-layer parameter codebookType set to TypeII-PortSelections. In one example, the UE 116 is configured with $P_{CSI-RS} \in \{8,12,16,24,32\}$ via higher-layer parameter nrof-Ports and with the value of $L \in \{2,3,4\}$ via higher-layer parameter numberOfBeams.

Continuing, in step 714, gNB 102 and gNB 103 send DL RS, e.g., CSI-RS, to the UE 116. In one example, the UE 116 can be configured with $P_{CSI-RS}=8$ and L=4. The gNB 102 and gNB 103 associate 4 TRPs (each transmitting 1 CSI-RS port with beamformed CSI RS using MF beamforming) with 4 CSI RS ports out of 8 CSI-RS ports and associate nothing for the remaining 4 CSI RS ports. Then, the gNBs transmits beamformed CSI-RS to the UE 116 according to the above configuration. Note that when $P_{CSI-RS}=4$ is configured, L=2 is only supported. Note also that the current specification allows the UE 116 to perform CSI reporting containing L beams (up to 4, as described above) and corresponding quantized phases and amplitudes. In one example, the gNB sets transmit power $\alpha_i = a_i / \|\gamma_i t^m g_i^H T_i\|^2$ for each TRP i, where $a_i > 0$.

For the next phase, in step 715, the UE 116 calculates the CSI feedback based on the received RS, e.g., CQI/RI/PMI. In one example, the gNB 102 intentionally adjust transmit power for a reference TRP, e.g., gNB 102, to be selected as the strongest port when the UE 116 computes CSI. For example, assuming a reference TRP is TRP1 (i.e., the first CSI-RS port), the gNB 102 sets transmit power as follows:

$$\alpha_1 = \frac{a_1}{\|\gamma_1 t^m g_1^H T_1\|^2} \text{ and } \alpha_i = \frac{a_2}{\|\gamma_i t^m g_i^H T_i\|^2} \text{ for } i = 2, 3, 4$$

where $a_1 > a_2$, which enables the UE 116 to select the port associated with the reference TRP 102 as the strongest port and normalizes the other amplitudes/phases associated with the other ports by the strongest ports when the UE 116 computes CSI. For example, the gNB 102 sets $a_1=2$ and $a_2=1$. In this case, based on (2), the UE 116 receives an equivalent channel for CSI-RSs sent from all TRPs:

$$\left[\frac{a_1 \gamma_1^*(t^m)^* r^m}{\|\gamma_1 t^m\|^2}, \frac{a_2 \gamma_2^*(t^m)^* r^m}{\|\gamma_2 t^m\|^2}, \frac{a_3 \gamma_L^*(t^m)^* r^m}{\|\gamma_3 t^m\|^2}, \frac{a_4 \gamma_L^*(t^m)^* r^m}{\|\gamma_4 t^m\|^2}, 0, 0, 0, 0\right]$$

If the UE 116 identifies that the first port is the strongest, then it will compute the CSI normalized by the coefficient associated with the first port, that is:

$$\left[1, \frac{a_2 \gamma_2^*/\|\gamma_2^*\|^2}{a_1 \gamma_1^*/\|\gamma_1^*\|^2}, \frac{a_2 \gamma_3^*/\|\gamma_3^*\|^2}{a_1 \gamma_1^*/\|\gamma_1^*\|^2}, \frac{a_2 \gamma_4^*/\|\gamma_4^*\|^2}{a_1 \gamma_1^*/\|\gamma_1^*\|^2}\right]$$

The UE 116 computes phases and amplitudes associated with the three beams (L−1), i.e., $\|X_{1k}\|=\|a_2\gamma_k\|/\|a_1\gamma_1\|$ and $\angle X_{1k}=\angle(\gamma_1^*/\gamma_k^*)$ for k=2, 3, 4 and feeds them back in a subband or wideband manner according to the configuration. Since $a_1$ and $a_2$ are known to the gNB 102, the gNB 102 can adjust the calibration coefficient matrix for TRP k using $\angle X_{1k}$ and $$\|X_{1k}\| \text{ to get } C_{k,1} = \frac{1}{\angle X_{1k} \cdot \frac{\gamma_k}{\|X_{1k}\| a_1/a_2}} T_k^{-1} R_k = \frac{1}{\gamma_1} T_k^{-1} R_k \text{ and:} \quad (4)$$

$$(h_k^{UL})^H C_{k,1}^{-1} = \gamma_1 t^m g_k^H T_k.$$

As shown in equations (1) and (4), the DL channels from TRPs/and k can be obtained by multiplying the same scaling factor with (1) and (4), respectively, which enables gNB 102 to design any coherent precoding for data transmission from the multiple TRPs. In step 716, the UE 116 calculates the CSI feedback and feeds the CSI to gNB 102 according to the configuration.

In step 717, the gNB 102 refines the phase and/or amplitude offset with respect to gNB 103 based on multiple UE feedback. The gNB 102 then applies the phase and/or amplitude offset to itself. In step 718, gNB 102 and gNB 103 select DL PDSCH transmission mode and beamforming weights. This is assuming that gNB 102's and gNB 103's signals can be received coherently at the UE 116. The example process 700 concludes with step 718, where the gNB applies the calibrated phase and then pre-codes PDSCH across multiple TRPs for PDSCH to the UE 116.

Figure 8A:
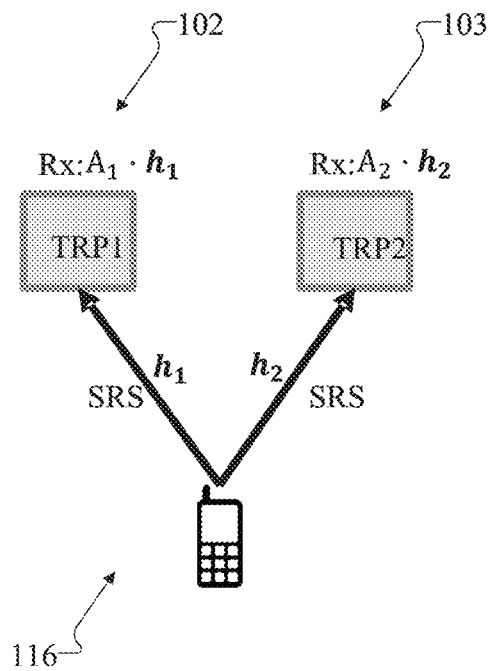
FIGS. 8A and 8B illustrate examples of UE-aided calibration according to embodiments of the present disclosure.
Figure 8B:
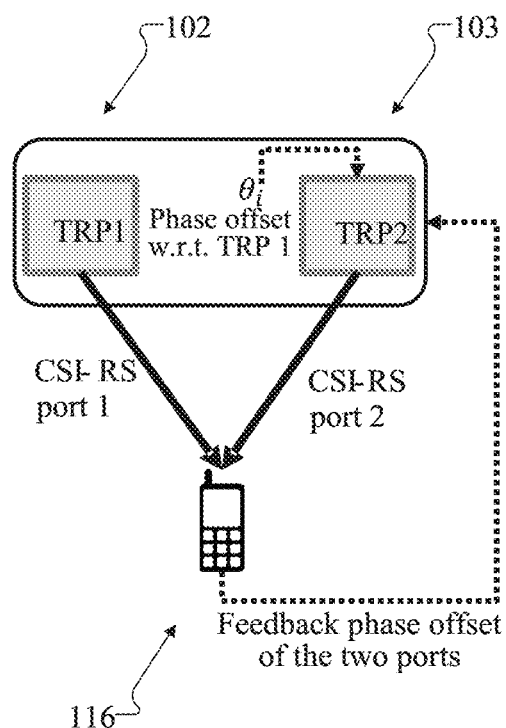

FIGS. 8A and 8B illustrates an example of UE-aided calibration with two TRPS for the UE 116. For example, the UE-aided calibration may be implemented by the UE 116, gNB 102 and gNB 103. FIGS. 8A and 8B are for illustration only and can be used without departing from the scope of the present disclosure.

As illustrated in FIG. 8A, gNB 102 and gNB 103 measures respective channels via SRS. The UE 116 sends SRS to gNBs 102 and 103. Then, gNBs 102 and 103 send a beamformed CSI-RS to the UE 116, as illustrated in FIG. 8B. In this phase, an iteration of N times, e.g., N=9, to obtain the phase of $$x = \frac{A_1}{A_2}$$

via a virtualized 2Tx transmission and feedback. To do coherent joint transmission (CJT), the phase of $$x = \frac{A_1}{A_2}$$

must be known. In the $i^{th}$ iteration,

Port 1: $p_1 = A_1^H h_1 / |h_1|$

Port 2: $p_2 = A_2^H e^{j\theta_i} h_2 / |h_2|$

Received signal at UE 116, e.g., 1 is sent, equates to $y_1 = A_1^H h_1^H \cdot p_1 + n_1 = A_1^H |h_1| + n_1$ $y_2 = A_2^H e^{j\theta_i} |h_2| + n_2$ two Tx Codebook (CB) wide beam (WB) PMI quantizes, $(A_1^H, A_2^H e^{j\theta_i}) \sim (1, x_H e^{j\theta_i})$. By combining N such measurement, one may estimate the phase of x accurately.

Figure 9A:
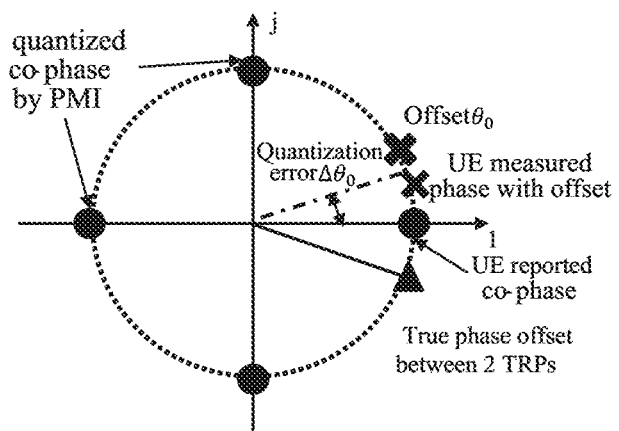
FIGS. 9A-9C illustrate an example of iterative phase calibration according to embodiments of the present disclosure.
Figure 9B:
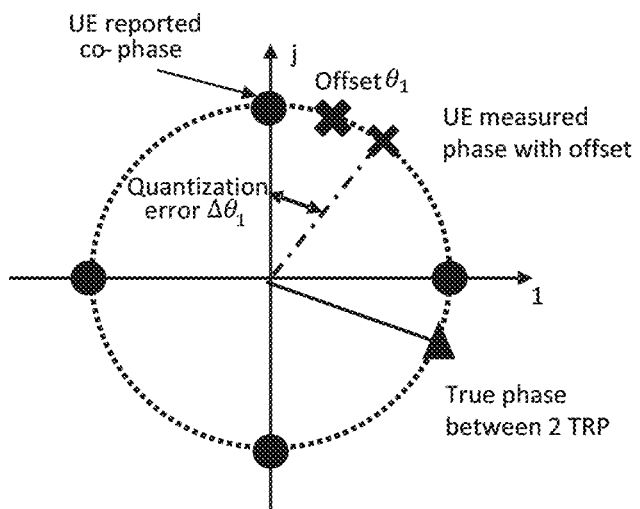
Figure 9C:
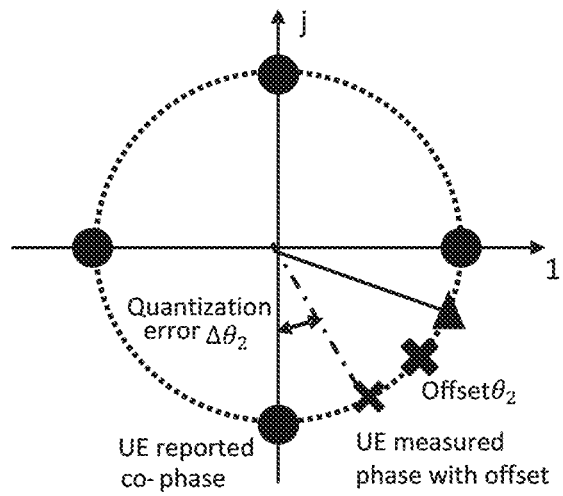

FIGS. 9A-9C illustrate an example of iterative phase calibration according to embodiments of the present disclosure. For example, phase calibration may be implemented by the UE 116, gNB 102 and gNB 103. FIGS. 9A, 9B, and 9C are for illustration only and can be used without departing from the scope of the present disclosure.

In FIG. 9A, in a first iteration, the gNB 102 transmits with a port2 phase offset $\theta_0$. The UE 116 reports to two TRPs a co-phase of 0 degrees. The gNB 102 estimates $$\angle \frac{A_2}{A_1} = 0 - \theta_0$$

Estimation error = $\Delta\theta_0$

In FIG. 9B, in a second iteration, the gNB 102 transmits with a port2 phase offset $\theta_1$. The UE 116 reports to two TRPs a co-phase of 90 degrees. The gNB estimates $$\angle \frac{A_2}{A_1} = \frac{(0 - \theta_0) + (90 - \theta_1)}{2}$$

Estimation error = $\frac{\Delta\theta_0 + \Delta\theta_1}{2}$

In FIG. 9C, in a third iteration, the gNB 102 transmits with a port2 phase offset $\theta_2$. The UE 116 reports to two TRPs a co-phase of −90 degrees. The gNB estimates $$\angle \frac{A_2}{A_1} = \frac{(0 - \theta_0) + (90 - \theta_1) + (-90 - \theta_2)}{3}$$

Estimation error = $\frac{\Delta\theta_0 + \Delta\theta_1 + \Delta\theta_2}{3}$

Assuming unknown quantization error $\Delta\theta_i$ is independently and identically distributed (i.d.d.) with zero-mean, the estimation error will decrease as iterations increase. The algorithm can be designed to minimize error given certain iterations.

In another embodiment, the amplitude will also be designed to compensate for the power difference of the ports to further improve the UE 116 quantization accuracy. This illustrative calibration behavior example corresponds to multiple steps in FIGS. 7A and 7B.

Figure 10:
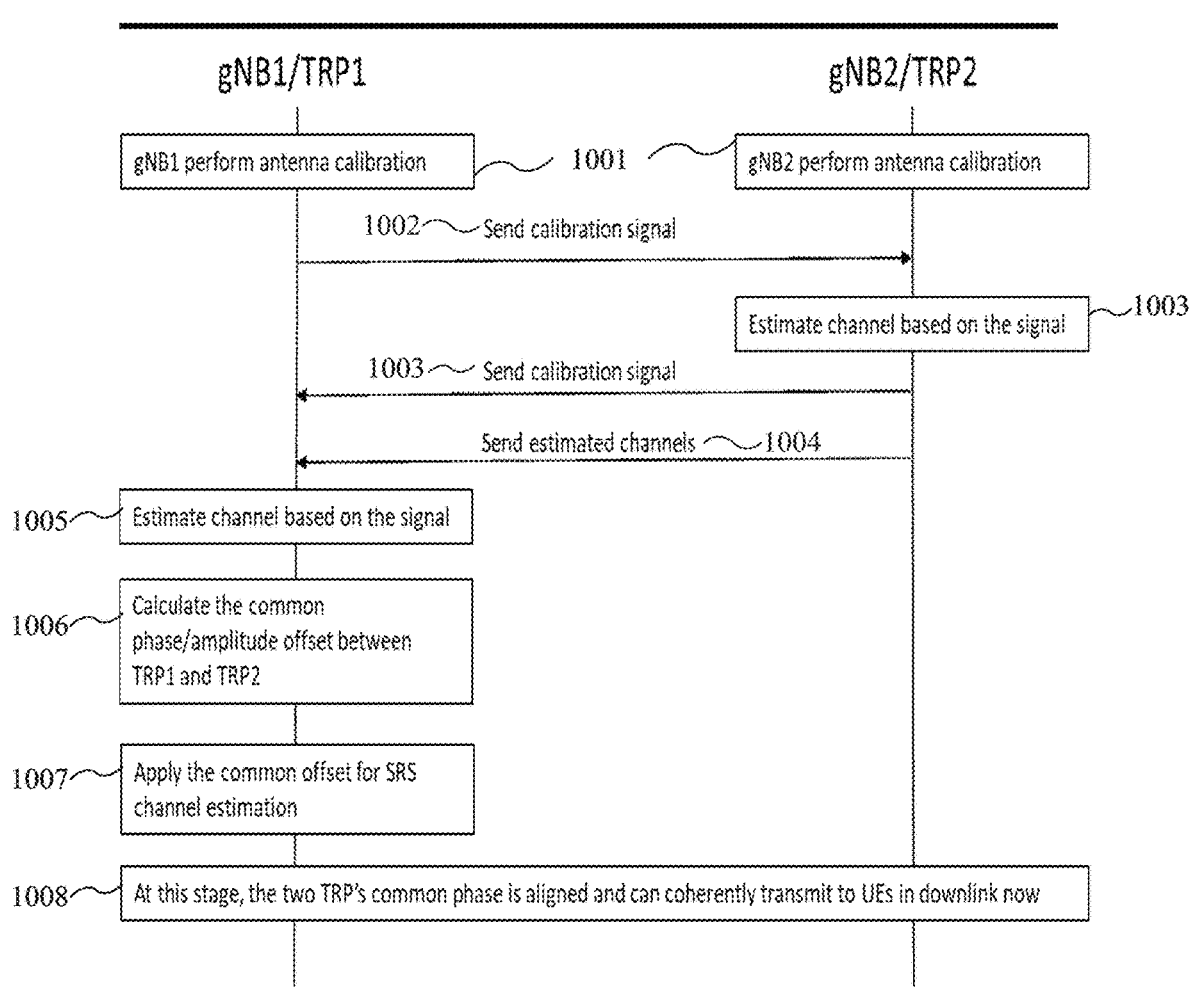
FIG. 10 illustrates an example of another process for phase calibration according to embodiments of the present disclosure.

FIG. 10 illustrates an example of another process 1000 for phase calibration according to embodiments of the present disclosure. For example, the process 1000 provides a calibration mechanism to enable phase and/or amplitude alignment among two or more gNBs or TRP. For example, the process 1000 may be implemented by gNB 102 and gNB 103. The process 1000 is for illustration only and other embodiments can be used without departing from the scope of the present disclosure.

The example process 1000 begins in step 1001 with the two or more TRPs initiating cross TRP calibration perform antenna calibration. In step 1002, gNB 102 sends a calibration signal to gNB 102 from at least some of gNB 102's antennas. gNB 103 receives the calibration signal at at least some of its receive antennas. In one embodiment, a dedicated antenna from gNB 102 and gNB 103 is used for this transmission and reception. In another embodiment, a subset of a TRP's antennas are used, where the selection of antennas can be based on antenna design, for example, antennas around the center are used to reduce edge effects. In another example, antennas distributed around the corners are used to improve spatial diversity performance. In another embodiment, the antenna selection can be changed among different iterations of calibration. In yet another embodiment, the calibration signal can be a WB RS existing in current NR or LTE, such as SRS or CSI-RS signals or PSS/SS signals.

In step 1003, gNB 103 estimate the channel between gNB 102 and gNB 103 and sends the estimated channel to gNB 102. In step 1004, gNB 103 sends calibration to gNB 102 from the same set of antennas used to receive gNB 102's calibration signal in step 1002. And gNB 102 receives the calibration signal using the same set of antennas used to transmit the calibration signal to gNB 103.

In step 1005, gNB 102 estimates the channel between gNB 102 and gNB 103. In step 1006, gNB 102 derives a common phase and amplitude offset that can be applied to ensure coherent reception during the following PDSCH transmission to UE 116. In step 1007, gNB 102 applies the common offset for SRS channel estimation. For example, the BS s 102 and/or 103 may verify the common phase offset based on applying the common phase offset for the reception of the SRS from the UE 116. In step 1008, gNB 102's and gNB 103's common phase is aligned and can coherently transmit to UE 116 in DL.

A fundamental principle of the above-proposed calibration is now illustrated by equations using two TRPs as an example. In the case of multiple TRPs, one could also perform alignment or calibration between a TRP pair and then use one of the calibrated TRPs to calibrate other TRPs until all TRPs are aligned.

Denote the physical channel between TRP1 and TRP2 as h, where the h can be viewed as a vectorized channel among transmit and receive antenna subset between TRP1 and TRP2. Denote the common TX and RX phase offset at TRP1 is $\phi_{tx,1}$, $\phi_{rx,1}$, and at TRP2 is $\phi_{tx,2}$, $\phi_{rx,2}$. When TRP1 sends a calibration signal and is received by TRP2, the receive signal is:

$h_{1 \to 2} = h e^{j(\phi_{tx,1} + \phi_{rx,2})}$

When TRP2 sends a calibration signal and is received by TRP1, the receive signal is:

$h_{2 \to 1} = h e^{j(\phi_{tx,2} + \phi_{rx,1})}$

Since $h_{1 \to 2}$ is fed back by TRP2 to TRP1, the TRP1 can compare the phase difference between $h_{1 \to 2}$ and $h_{2 \to 1}$, that is:

$A = h_{2 \to 1}{}^H h_{1 \to 2} = |h|^2 e^{j(\phi_{tx,1} + \phi_{rx,2} - \phi_{tx,2} - \phi_{rx,1})}$ It is noted that $\angle A = \phi_{tx,1} + \phi_{rx,2} - \phi_{tx,2} - \phi_{rx,1} = \phi_{tx,1} - \phi_{rx,1} - (\phi_{tx,2} - \phi_{rx,2})$ Assume UE 116 antenna m transmits SRS to gNB 102 and gNB 103 and each of the gNBs applies conjugate beamforming to make sure that the signal at the UE 116 is coherently combined. Following Equation (2):

$$(h_1^{DL})^H w_1 = r^m g_1^H T_1 (\gamma_1 t^m)^* T_1^H g_1 = \gamma_1^*(t^m)^* r^m \|T_1^H g_1\|^2$$

$$(h_2^{DL})^H w_2 = r^m g_2^H T_2 (\gamma_2 t^m)^* T_2^H g_2 = \gamma_2^*(t^m)^* r^m \|T_2^H g_2\|^2$$

Note that $\gamma_i$ represents the common phase offset within TRP i, that is $$\angle \gamma_i = \phi_{tx,i} - \phi_{rx,i}$$

As long as $\angle \gamma_1^*$ and $\angle \gamma_2^*$ have the same phase, the above two signals can be added coherently, i.e., the phase of the two signals are identical. Also, note that $$\angle \gamma_1^* - \angle \gamma_2^* = -\angle A$$

is already estimated by gNB 102. So gNB 102 can pre-apply this common phase offset so that the signals from gNB 102 and gNB 103 can be phase aligned or coherently received.

Figure 11:
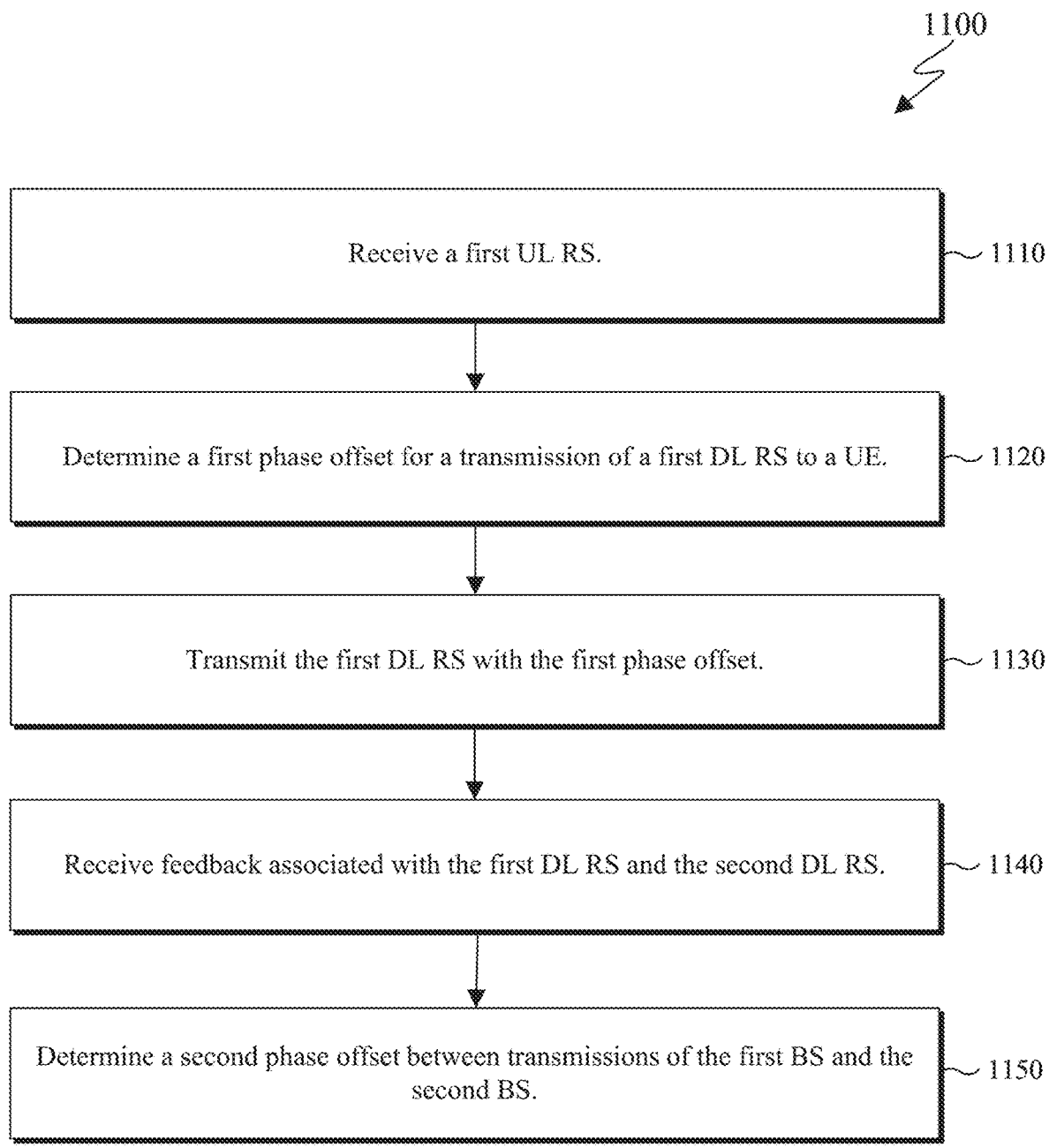
FIG. 11 illustrates an example of a method performed by a BS according to embodiments of the present disclosure.

FIG. 11 illustrates a flowchart of an example method 1100 performed by a BS according to various embodiments of the present disclosure. For example, the process 1000 may be implemented by gNB 102 and gNB 103 and a corresponding process may be performed by UE 116. The process 1000 is for illustration only and other embodiments can be used without departing from the scope of the present disclosure. For example, while phase offset calibration is discussed a similar process may also be performed for amplitude calibration.

The example process 1100 begins in step 1110. The BS 102 is configured to receive a first UL RS. Then, in step 1120, BS 102 determines a first phase offset for transmission of a first DL RS to a UE. For example, in step 1120, the first phase offset is determined based on the first UL RS and a second UL RS. For example, the second UL RS is associated with a second BS. For example, the first phase offset of the first DL RS is relative to a second DL RS associated with the second BS.

In various embodiments, to determine the first phase offset, BS 102 receives a number of iterations of the first UL RS. The BS also determine a first channel estimate based on measurement of the number of iterations of the first UL RS. BS 102 also determines the first phase offset based on the phase ratio and determine a phase ratio between the first BS 102 and the second BS 103 based on the first channel estimate and a second channel estimate, the second channel estimate is based on a number of iterations of the second UL RS associated with the second BS.

In step 1130, BS 102 transmits the first DL RS with the first phase offset. In various embodiments, to determine the second phase offset, the BS 102 transmits a first number of iterations of the first DL RS. BS 102 also receives a number of feedback iterations including feedback associated with the first number of iterations of the first DL RS and a second number of iterations of the second UL RS that is associated with the second BS 103. BS 102 also modifies the first phase offset in one or more of the first number of iterations based on the number of feedback iterations and determines the second phase offset based on the modification of the first phase offset and the received number of feedback iterations. BS 102 also determines a next phase offset for transmission of a next iteration of the first number of iterations of the first DL RS based on a previous phase offset of a previous iteration of the first number of iterations of the first DL RS and an estimate of a quantization error associated with a UE reported phase offset associated with the previous iteration.

In step 1140, BS 102 receives feedback associated with the first DL RS and the second DL RS. For example, the feedback is based on the first DL RS from the first BS 102 and the second DL RS from the second BS 103 virtualized as a multiple transmit antenna port transmission from a single BS. In various embodiments, BS 102 transmits a first calibration signal to the second BS 103 and receives a second calibration signal from the second BS 103.

In step 1150, BS 102 determines a second phase offset between transmissions of the first BS and the second BS. For example, in step 1150, the BS 102 may determine the second phase offset based on the first phase offset and the received feedback for a DL data transmission to the UE and may perform the DL transmission by applying the determined phase offset.

In various embodiments, BS 102 determines a phase offset between transmissions of the first BS 102 and the second BS 103 for a DL data transmission to the UE 116 based on the first phase offset and the received feedback. The BS 102 also estimates a channel between the first BS 102 and the second BS 103 based on the second calibration signal and determines a common phase offset between transmissions from the first BS 102 and the second BS 103 based on the channel estimate. The BS 102 also verifies the common phase offset based on applying the common phase offset for reception of a SRS from the UE 116.

Any of the above variation embodiments can be utilized independently or in combination with at least one other variation embodiment.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A first base station (BS), comprising:
   a transceiver configured to receive a first uplink (UL) reference signal (RS); and
   a processor operably coupled to the transceiver, the processor configured to determine, based on the first UL RS and a second UL RS, a first phase offset for transmission of a first downlink (DL) RS to a user equipment (UE),
   wherein the second UL RS is associated with a second BS,
   wherein the first phase offset of the first DL RS is relative to a second DL RS associated with the second BS,
   wherein the transceiver is further configured to:
      transmit the first DL RS with the first phase offset, and
      receive, from the UE, feedback associated with the first DL RS and the second DL RS, and
   wherein the processor is further configured to determine, based on the first phase offset and the received feedback, for a DL data transmission to the UE, a second phase offset between transmissions of the first BS and the second BS.

2. The first BS of claim 1, wherein to determine the first phase offset:
the transceiver is further configured to receive a number of iterations of the first UL RS; and
the processor is further configured to:
determine a first channel estimate based on measurement of the number of iterations of the first UL RS,
determine a phase ratio between the first BS and the second BS based on the first channel estimate and a second channel estimate, wherein the second channel estimate is based on a number of iterations of the second UL RS associated with the second BS, and
determine the first phase offset based on the phase ratio.

3. The first BS of claim 1, wherein to determine the second phase offset:
the transceiver is further configured to:
transmit a first number of iterations of the first DL RS; and
receive, from the UE, a number of feedback iterations including feedback associated with (i) the first number of iterations of the first DL RS and (ii) a second number of iterations of the second UL RS that is associated with the second BS, respectively; and
the processor is further configured to:
modify, based on the number of feedback iterations, the first phase offset in one or more of the first number of iterations, and
determine the second phase offset based on the modification of the first phase offset and the received number of feedback iterations.

4. The first BS of claim 3, wherein the processor is further configured to determine a next phase offset for transmission of a next iteration of the first number of iterations of the first DL RS based on (i) a previous phase offset of a previous iteration of the first number of iterations of the first DL RS and (ii) an estimate of a quantization error associated with a UE reported phase offset associated with the previous iteration.

5. The first BS of claim 1, wherein the feedback is based on the first DL RS from the first BS and the second DL RS from the second BS virtualized as a multiple transmit antenna port transmission from a single BS.

6. The first BS of claim 1, wherein:
the transceiver is further configured to:
transmit a first calibration signal to the second BS, and
receive a second calibration signal from the second BS; and
the processor is further configured to:
estimate, based on the second calibration signal, a channel between the first BS and the second BS; and
determine, based on the channel estimate, a common phase offset between transmissions from the first BS and the second BS.

7. The first BS of claim 6, wherein the processor is further configured to verify the common phase offset based on applying the common phase offset for reception of a sounding RS (SRS) from the UE.

8. A user equipment (UE) comprising:
a transceiver configured to:
transmit an uplink (UL) reference signal (RS),
receive a first downlink (DL) RS from a first base station (BS), and
receive a second DL RS from a second BS, wherein the DL RS has a first phase offset relative to the second DL RS and wherein the first phase offset is associated with the UL RS; and
a processor operably coupled to the transceiver, the processor configured to determine, based on the first DL RS and a second DL RS, feedback associated with the first DL RS and the second DL RS,
wherein the transceiver is further configured to:
transmit the feedback, and
receive a DL data transmission based on signals from the first BS and the second BS, respectively, wherein the signal from the first BS has a second phase offset relative to the signal from the second BS and wherein the second phase offset is associated with the feedback.

9. The UE of claim 8, wherein:
the transceiver is further configured to transmit a number of iterations of the UL RS, and
the first phase offset is based on a phase ratio between the first BS and the second BS associated with the number of iterations of the UL RS.

10. The UE of claim 8, wherein:
the transceiver is further configured to:
receive a first number of iterations of the first DL RS; and
receive a second number of iterations of the first DL RS; and
transmit a number of feedback iterations including feedback associated with (i) the first number of iterations of the first DL RS and (ii) the second number of iterations of the second UL RS, respectively;
the first phase offset in one or more of the first number of iterations is modified based on the number of feedback iterations; and
the second phase offset is based on the modification of the first phase offset and the number of feedback iterations.

11. The UE of claim 10, wherein a next phase offset for a next iteration of the first number of iterations of the first DL RS based on (i) a previous phase offset of a previous iteration of the first number of iterations of the first DL RS and (ii) an estimate of a quantization error associated with a UE reported phase offset associated with the previous iteration.

12. The UE of claim 8, wherein the feedback is based on the first DL RS from the first BS and the second DL RS from the second BS virtualized as a multiple transmit antenna port transmission from a single BS.

13. The UE of claim 8, wherein the transceiver is further configured to transmit a sounding RS (SRS) for verification of a common phase offset between the first BS and the second BS.

14. A method performed by a first base station (BS), the method comprising:
receiving a first uplink (UL) reference signal (RS);
determining, based on the first UL RS and a second UL RS, a first phase offset for transmission of a first downlink (DL) RS to a user equipment (UE), wherein the second UL RS is associated with a second BS and wherein the first phase offset of the first DL RS is relative to a second DL RS associated with the second BS;
transmitting the first DL RS with the first phase offset;
receiving, from the UE, feedback associated with the first DL RS and the second DL RS; and
determining, based on the first phase offset and the received feedback, for a DL data transmission to the UE, a second phase offset between transmissions of the first BS and the second BS.

15. The method of claim 14, wherein determining the first phase offset further comprises:
receiving a number of iterations of the first UL RS;
determining a first channel estimate based on measurement of the number of iterations of the first UL RS;
determine a phase ratio between the first BS and the second BS based on the first channel estimate and a second channel estimate, wherein the second channel estimate is based on a number of iterations of the second UL RS associated with the second BS; and
determining the first phase offset based on the phase ratio.

16. The method of claim 14, wherein determining the second phase offset further comprises:
transmitting a first number of iterations of the first DL RS;
receiving, from the UE, a number of feedback iterations including feedback associated with (i) the first number of iterations of the first DL RS and (ii) a second number of iterations of the second UL RS that is associated with the second BS, respectively;
modifying, based on the number of feedback iterations, the first phase offset in one or more of the first number of iterations; and
determining the second phase offset based on the modification of the first phase offset and the received number of feedback iterations.

17. The method of claim 16, further comprising determining a next phase offset for transmission of a next iteration of the first number of iterations of the first DL RS based on (i) a previous phase offset of a previous iteration of the first number of iterations of the first DL RS and (ii) an estimate of a quantization error associated with a UE reported phase offset associated with the previous iteration.

18. The method of claim 14, wherein the feedback is based on the first DL RS from the first BS and the second DL RS from the second BS virtualized as a multiple transmit antenna port transmission from a single BS.

19. The method of claim 14, further comprising:
transmitting a first calibration signal to the second BS;
receiving a second calibration signal from the second BS;
estimating, based on the second calibration signal, a channel between the first BS and the second BS; and
determining, based on the channel estimate, a common phase offset between transmissions from the first BS and the second BS.

20. The method of claim 19, further comprising verifying the common phase offset based on applying the common phase offset for reception of a sounding RS (SRS) from the UE.

* * * * *